Figure 1:
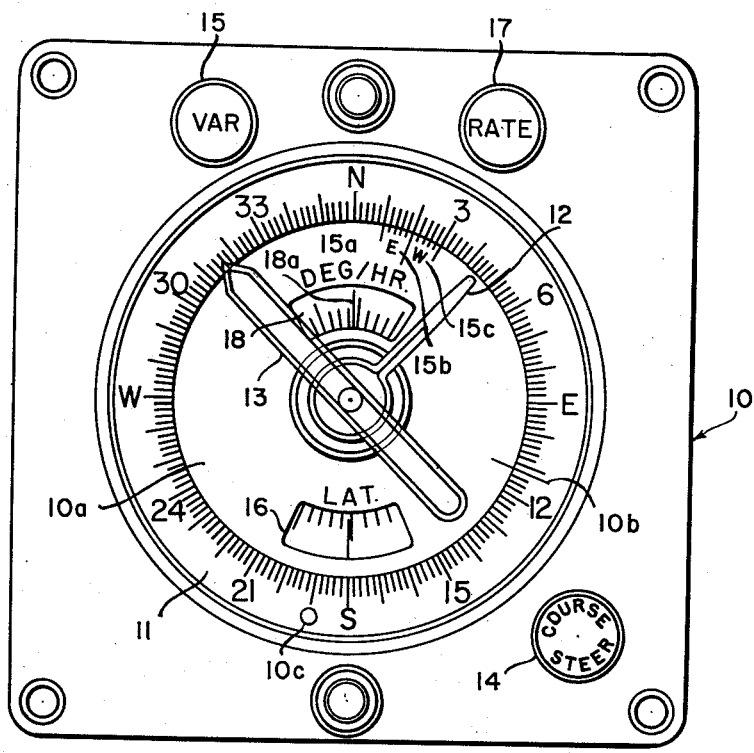

Nov. 6, 1962   J. G. WRIGHT   3,062,437
MASTER DIRECTION CORRECTOR
Filed Feb. 13, 1961   4 Sheets-Sheet 1

INVENTOR
JERAULD G. WRIGHT
BY *Smart & Biggar*
ATTORNEYS.

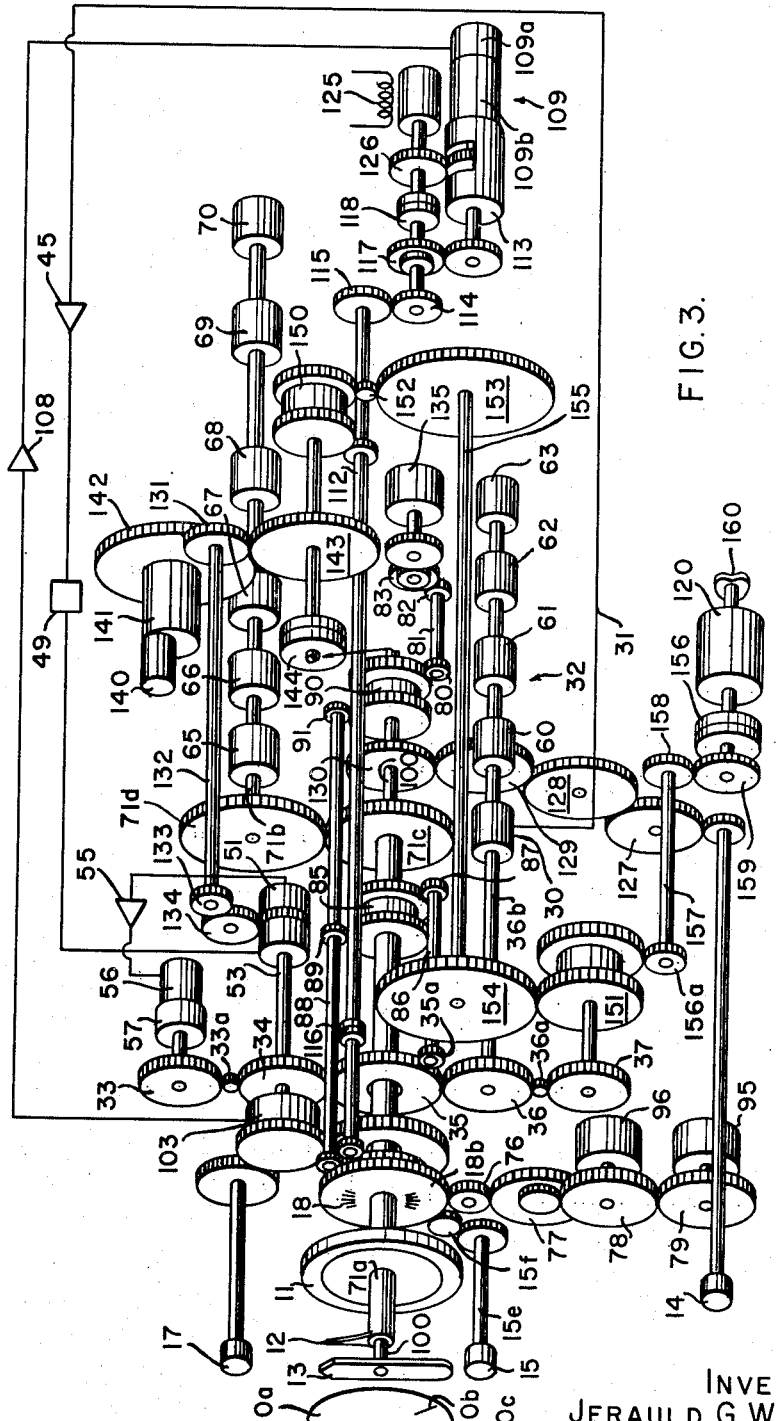

United States Patent Office 3,062,437
Patented Nov. 6, 1962

3,062,437
MASTER DIRECTION CORRECTOR
Jerauld George Wright, Dartmouth, Nova Scotia, Canada, assignor to Her Majesty the Queen in right of Canada, as represented by the Minister of National Defence
Filed Feb. 13, 1961, Ser. No. 88,905
Claims priority, application Canada Feb. 15, 1960
9 Claims. (Cl. 235—61)

This invention relates to a method and apparatus for continuously establishing the relationship of a primary directional index located in an aircraft to an arbitrary basis of observation. More specifically the invention relates to aerial navigational systems, in which a primary directional index is located in the aircraft and the directional information available therefrom is utilized and processed in a manner such that selected navigational aids, auto pilots and the like may be provided with directional information compatable with their requirements whatever may be the nature of the primary index (free gyro compass, magnetic compass, etc.) and the basis of observation (celestial observation, magnetic flux valve monitoring, etc.).

In aerial navigation in particular a variety of heading indications are required. Aerial navigational charts are almost invariably correlated to true north as an arbitrary basis of observation, whereas the airways, airport runways, etc. (that information with which the pilot of the aircraft is concerned) are in the main related to magnetic north as the arbitrary basis of observation. With the advent of transpolar flights several grid systems which are purely artificial and take neither true geographical or magnetic north as a basis have been devised. In northern latitudes it is not unusual for the primary directional index of the aircraft to be a free directional gyro which offers to navigator and pilot merely a path in space without direct reference to true geographical or magnetic north.

It is an object of the present invention to permit the crew of an aircraft to have before them, aircraft heading data compatable with requirements regardless of the selected arbitrary basis of observation.

According to the present invention a method for continuously establishing the relationship of a primary directional index located in a vessel or craft, for example an aircraft, comprises the steps of maintaining the analogue of vessel heading with reference to said primary directional index as a shaft position of a first rotatable shaft; maintaining the analogue of a calculated value of variation of said primary index from an index based on said arbitrary basis of observation as a shaft position of a second rotatable shaft; maintaining the derived analogue of rate of change of said variation attributable to a selected reason as a speed of rotation of a third rotatable shaft; and algebraically summing said first and second analogues and the integral of said third analogue whereby to express the analogue of the result as the position of a further rotatable shaft, being the analogue of vessel heading with respect to said arbitrary basis of observation at any given moment.

According to the feature of the invention apparatus for use with a directional index element which is located in a vessel and is capable of generating a reference analogue output signal, which apparatus continuously establishes the relationship of the output analogue signal from said directional index to an arbitrary basis of observation comprises: a first rotatable shaft, means for positioning said first rotatable shaft in response to said output signal; a second rotatable shaft; means for positioning said second rotatable shaft to correspond to the analogue of the calculated value of variation of said directional index from an index based on said arbitrary basis of observation; a third rotatable shaft; motor means for driving said third shaft at an angular speed analogous with the derived analogue of the rate of change of said variation attributable to a selected reason; a further rotatable shaft; and differential means for algebraically summing said first and second analogues and the integral of said third analogue whereby to express the analogue of the result as the position of said further rotatable shaft, being the analogue of vessel heading with respect to said arbitrary observation at any given moment.

The said further rotatable shaft may, in accordance with this invention be adapted to provide a heading signal for an auto pilot control means, which is isolated from inadvertance or interference on the part of either the navigator or passer-by.

Furthermore the further rotatable shaft may in addition or as an alternative be adapted to cooperate with a visual indicator whereby to indicate to the navigator the heading of the aircraft with respect to said geographical true reference.

It will be appreciated that where the directional index element generates a signal analogous to the heading of the aircraft as expressed in degrees magnetic, the variation to be added to that signal in order to get an expression of true heading will be a magnetic variation, however where the directional index element is for example, a free gyroscope, then a calculation must be made on the part of the navigator to establish the value of the variation of the analogue signal being transmitted by the directional index element from geographical true north and under these circumstances it is the analogue of such variation that is applied to the second rotatable shaft.

Furthermore, it will be understood that where the directional index element is transmitting a signal analogous with the aircraft magnetic heading the selected reason to which the change in variation is attributable will be the aircraft's flight path with respect to the magnetic meridians and it is the analogue of this change of magnetic variation which is utilized as the basis of selection of the angular speed of the third shaft.

In the instance where the directional index element is a free gyroscope capable of being slaved, it is a feature of the present invention that the change of variation may be selected as the gyro drift rate and to further provide means whereby the further rotatable shaft may be corrected by direct and simultaneous reference to a celestial body. Under this last circumstance the variation applied in analogue form to the second shaft may be the last known value of magnetic variation.

In the following description one embodiment of the invention is described with reference to an aerial navigational instrument and is described, in the main, with reference to its utilization with a flux valve which generates a signal of magnetic heading.

Figure 2:
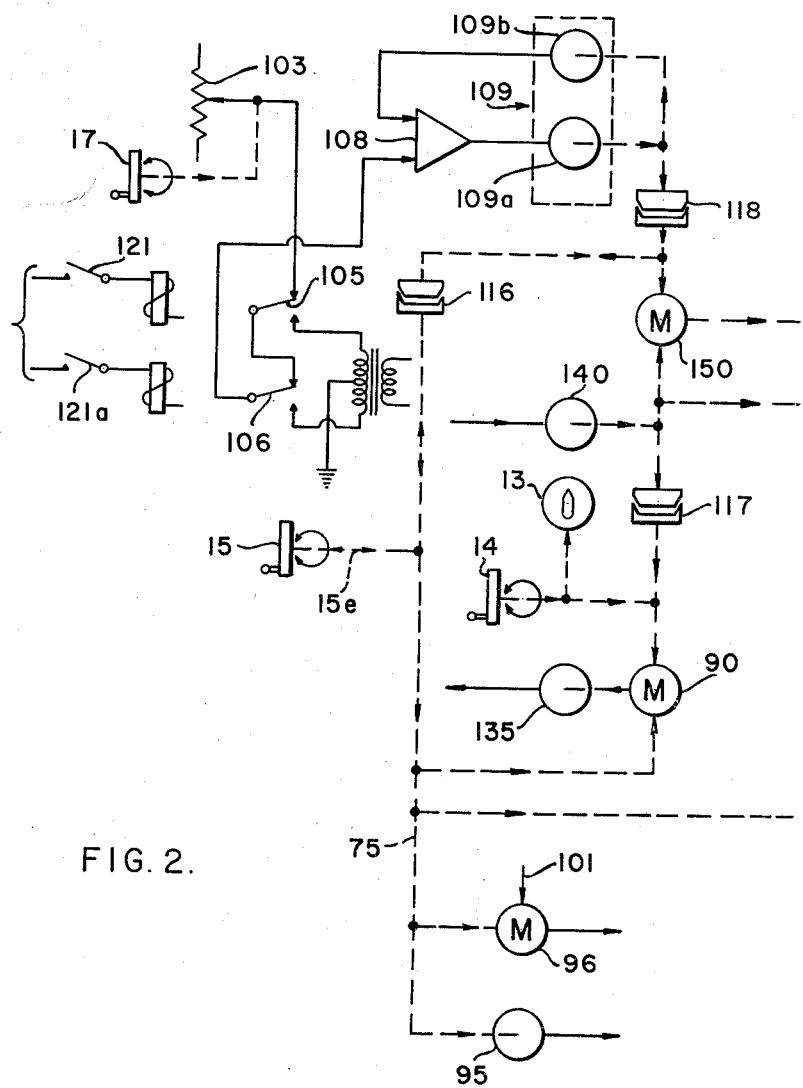
Figure 2A:
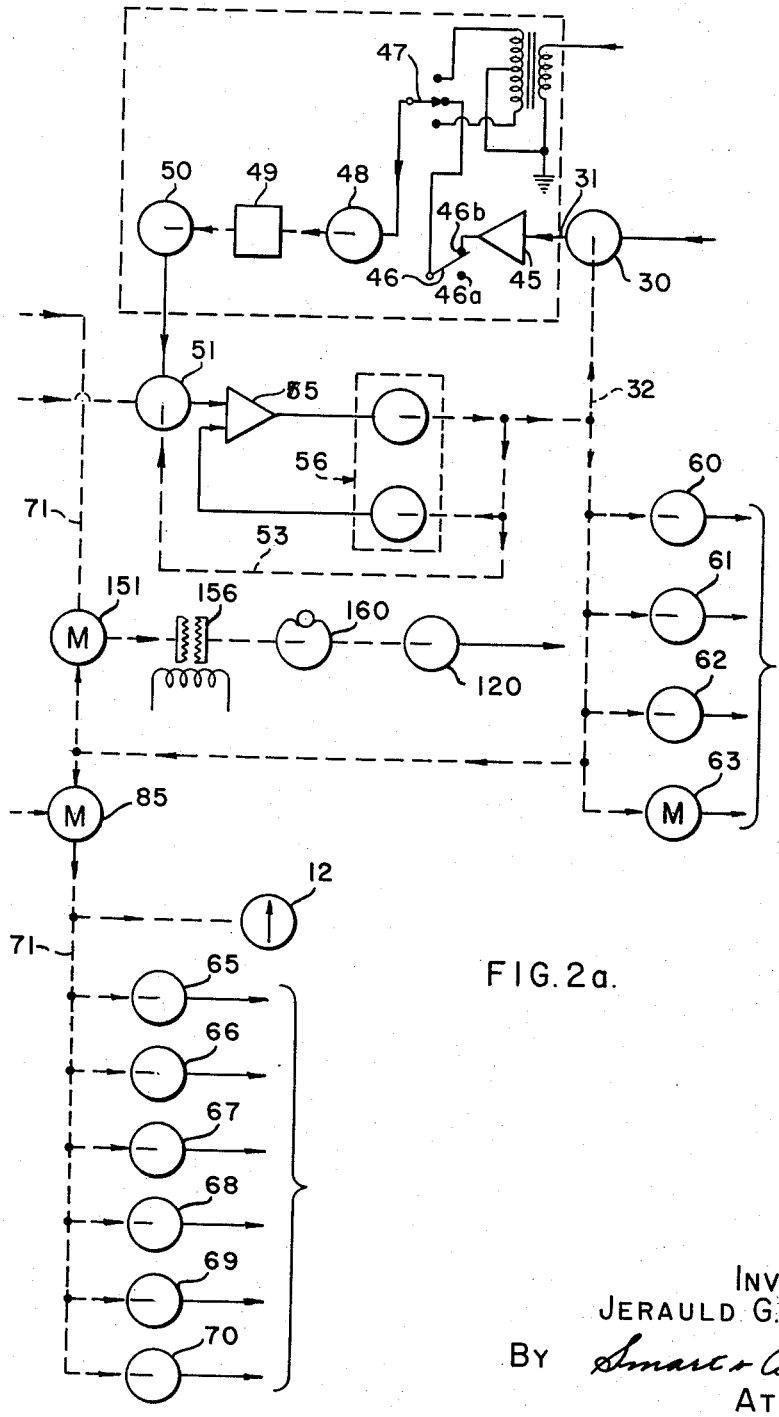

Referring now to the accompanying drawings, in which:
FIGURE 1 is a front elevational view of the face of the instrument;
FIGURES 2 and 2a together form a diagram representation of the information flow in the instrument, and
FIGURE 3 is a mechanical schematic diagram of the instrument.

Referring now to FIGURE 1. This figure shows the face of the instrument which is intended to be mounted at the navigator's station in an aircraft. The instrument 10 has a rotatable transparent plate 10a provided with an index mark 10b and a knob 10c permitting the plate to be used as a cursor. Behind the plate is a fixed ring 11 graduated in the manner of a compass card. A pointer 12 indicates in "Degrees True" the heading of the aircraft and a pointer 13 shows the course to steer command set into the instrument by the navigator by rotation of a knob 14. A variation control knob 15 is provided for setting into the instrument the magnetic variation prevalent in the area in which the aircraft is flying, an indication of which variation is given on the index 15a. Correction for deviation may be made by first superimposing the cursor 10b upon the variation index 15 and then offsetting the variation index 15 until the known deviation value is read against the cursor 10b from the deviation scales 15b and 15c. For the area to be covered in the aircraft flight path a rate of change of variation is set into the instrument by the rate knob 17. The rate of change of variation is indicated in degrees per hour at the index 18a by dial 18 on the instrument. Also on the dial 18 there is provided a scale 16 graduated in degrees of latitude. This scale is turned with the variation rate scale. The purpose of this scale is to correct for apparent gyro drift (due to earth's rotation) when the flux valve is inoperative and the scale may be in this circumstance utilized instead of the variation rate scale.

The instrument described herein is capable of accepting a reference signal from either a free directional gyro or from a remote transmitter of magnetic heading reference (e.g. a flux valve). The information derived from either of these sources is processed within the instrument to provide a magnetic heading reference for the aircraft pilot and a true heading reference for the navigator. Corrections for magnetic variation and rate of change of magnetic variation and magnetic deviation are made within the instrument to the incoming reference signal in order to provide true heading indication for the navigator. The navigator may also utilize the instrument to set in a command course to steer in degrees true, which command is first continuously corrected for variation and for the convergency of meridians and converted to a magnetic course to steer, which course is then repeated on an instrument located at the pilot's station. As will be seen from the following description the instrument of the invention is coupled to an auto pilot control unit so that the auto pilot is supplied with a command course to steer which course has been corrected for convergency so that the actual course flown by the aircraft if the command is followed will be a great circle course.

In the following the description has, for the sake of clarity, been split into a plurality of sections hereinafter called circuits and each circuit is described individually.

The Magnetic Heading Circuit

The magnetic heading circuit in the present instrument is essentially two separate servo follow-up systems in cascade with a signal feed back loop. The output from a flux valve (not shown) is fed to control transformer 30 which generates a reference analogue output signal of magnetic heading. The rotor 31 of control transformer 30 is connected directly to what is shown in FIGURES 2 and 2A diagrammatically as the magnetic heading shaft 32. The shaft 32 actually exists as a number of gears, 33, idler 33a, 34 idler 35, 36, idler 36a and 37, (FIGURE 3) which couple the magnetic heading synchros together and for simplicity is shown in FIGURE 2 and 2a as a rotatable shaft. The output error signal from the rotor 31 of control transformer 30 is tuned by capacitors (not shown) and is then fed to the input of an amplifier 45. The amplifier output passes through a magnetic directional gyro slaving switch 46, and through a manual slaving switch 47 (FIGURES 2a and 2b) and out to the variable phase of the slaving torque motor 48 of a gyro 49. As a result of this slaving voltage the gyro 49 slaves at its normal slow-slaving rate of approximately 2° per minute. The gyro 49 stabilizes the output reference analogue signal from the control transformer 30.

The heading transmitter 50 in the gyro 49 is connected to gyro control transformer 51. The rotor 53 of the control transformer 51 is also coupled directly to the schematic magnetic heading shaft 32 through gear 34. The error signal from the control transformer 51 is fed to the input of heading amplifier 55 and the output of amplifier 55 is returned to the variable phase of the heading servomotor-generator 56. Motor-generator 56 is coupled through a gear box 57 to the magnetic heading shaft 32 (through gear 33) which turns the rotors of flux valve control transformer 30 (through gear 36) and gyro control transformer 51 (through gear 34).

This servo drive has a fast follow-up rate in comparison with the gyro slaving rate of gyro 49. The gyro follow-up circuit has a maximum rate of approximately 36° per second.

To follow through the operation it can be assumed that the schematic magnetic heading shaft 32 follows the heading synchro 50 in the gyro 49 with practically no error signal. This is, for every degree change of heading made by the gyro 49, the magnetic heading shaft 32 will move 1° and there will be a negligible time lapse between the two changes.

Now, if the magnetic shaft 32 has a position which does not agree with the signal being transmitted by the flux valve, there will be an error signal from the flux valve control transformer 30. This error signal will cause the gyro 49 to precess and change its heading, and this change of heading will be transmitted to gyro control transformer 51 where servo motor 56 will turn the heading shaft 32 to reduce the error signal for the control transformer 51 to zero and to keep the error signal at zero. This rotation will continue as long as there is an error signal from flux valve control transformer 30. As the rotor 31 of control transformer 30 slowly rotates in response to the signal from the gyro 49 the error signal will gradually reduce to a negligible value when the gyro 49 will no longer precess nor will the magnetic heading shaft 32 be turned by servo motor generator 56. At this time the shaft 32 will have a position which is equivalent to the magnetic heading being transmitted by the remote flux valve. Thus, the shaft 32 is positioned in accordance with the magnetic heading reference analogue signal.

When the system is in the slaved mode of operation, that is when switch 46 makes contact 46b, or when the system is in the directional gyro mode of operation and there is a large difference of angle between the analogue position of the shaft 32 and the magnetic heading analogue as transmitted by the flux valve, there will be a long time lapse for the system to reach synchronization because of the 2° per minute slaving rate. Associated with the manual slaving control switch 47 there is an increase-decrease indicator (not shown). The manual slaving switch 47 can be operated according to the increase or decrease indication of the indicator to rapidly bring the system into synchronization. Operation of the manual slaving switch yields a slaving rate equivalent to the fast slaving rate of the amplifier 45 which is approximately 60° per minute.

The magnetic heading shaft 32 is connected by gear 36 to shaft 36b to three synchro transmitters 60, 61, 62, and one synchro differential 63. The shaft 32 positions these elements in accordance with its own analogue position. Synchro transmitter 60 transmits an analogue signal of magnetic heading to a pilot's compass repeater or an instrument such as described and claimed in the Wright copending patent application Serial No. 792,516, filed February 15, 1960, now Patent No. 2,951,578, synchro transmitter 61 transmits an analogue signal of magnetic heading to a co-pilot's instrument and synchro transmitter 62 transmits an analogue signal of magnetic heading to a heading indicator at another crew member's position for example a MAD operator's station. Synchro differential 63 may be used, if necessary, to convert relative bearings to magnetic bearings.

The analogue of magnetic heading in the instrument is also transmitted mechanically to an auto-pilot synchro through gear 37 and to a true heading shaft in the instrument through gear 35a, shaft 86 and gear 87, for a purpose which will be hereinafter described.

The True Heading Circuit

True heading in the instrument is a mechanical drive. Connected to a further schematic true heading shaft 71 (comprising shafts 71a, 71b and gears 71c, 71d FIGURE 3) are six separate synchro transmitters 65, 66, 67, 68, 69, 70 as well as the true heading pointer 12 on the instrument face. True heading is obtained in the instrument by the subtraction of the analogue of calculated magnetic variation from the transmitted analogue of magnetic heading by mechanical differential 85.

The six synchro transmitters 65, 66, 67, 68, 69 and 70 are used to transmit the analogue of true heading respectively, for example to a dead reckoning computer, such as that described and claimed in the Wright et al. copending patent application Serial No. 792,520, filed February 15, 1960, now abandoned, a ground speed and interceptor computer, such as described and claimed in the Wright et al. Canadian Patent 582,382, dated September 1, 1959, a search radar station, an astro compass controller, such as that described and claimed in the Wright copending patent application, Serial No. 792,517, filed February 15, 1960, now Patent No. 3,015,887, an APA-69 radar and to a radio magnetic indicator.

The manner in which true heading is obtained will now be more fully described with reference to:

The Variation Circuit

The navigator obtains from his navigational tables the magnetic variation prevalent in the latitude in which he is flying and manually sets into the instrument by means of the variation knob 15 at the upper left corner of the instrument bezel the analogue of magnetic variation. This knob is a press-to-set control, which positions the schematic variation shaft 75 comprising gears 76, 77, 78, 79. The actual value of the analogue of magnetic variation set into the instrument is read against the compass by the central line 18a of the small deviation scale 18 on the front of the instrument. The scale 18 is engraved in a dial 18b, the periphery of which is provided with gear teeth. Rotation of knob 15 is transmitted through shaft 15a and idler 15b, to dial 18b. To set in easterly variation, the variation index of the deviation scale is moved towards the east heading graduation and vice versa for a westerly variation. Deviation is added to this reading by placing the cursor 19 over the variation setting and moving the deviation scale to either of the "E" or "W" scales in accordance with the deviation required. This, it will be noted is in accordance with the rule that easterly or "plus" deviation is added to the variation setting if the variation is easterly and subtracted from the variation setting if the variation is westerly. The converse is true for westerly or "minus" deviation.

A mechanical differential 85 has as inputs the analogue of magnetic heading, from idler 35, gear 35a, shaft 86 and gear 87, and the analogue of variation from shaft 88 through gear 89. The differential 85 subtracts the analogue of variation from the analogue of magnetic heading and provides the analogue of true heading for retransmission and for the shaft 71a and pointer 12. The analogue of variation also goes to a second mechanical differential 90 via shaft 88 and gear 91 where it adds to the analogue of true course to steer from shaft 100 (see Course to Steer Circuit hereinafter) to convert the true course to a magnetic course to steer for the pilot and co-pilot's command azimuth indicators. An indicator of this type is described in the copending Wright application Serial No. 792,516 filed February 15, 1960.

The take-off of magnetic course to steer from differential 90 is through gear 80, shaft 81, gears 82, 83 and synchro 135.

The analogue of variation also positions two synchro transmitters 95, 96 through gears 77, 78, 79. Synchro transmitter 95 transmits an electrical analogue of variation to a remote variation indicator at another navigational station within the aircraft and differential synchro transmitter 96 adds the analogue of variation to a true tactical command azimuth signal electrically transmitted on line 101 (FIGURE 2a) from a tactical command station and retransmits this as a magnetic command azimuth to the pilot's instrument, for example (see the Wright copending application Serial No. 792,516).

Knowing the proposed path of flight for the aircraft the navigator is able to derive, from his tables, the rate of change of variation for his flight path. Provision is therefore made to enable the navigator to set into the instrument the analogue of rate of change of variation.

The rate control knob 17 on the face of the instrument positions the variation rate scale 18 or the latitude rate scale 16 (whichever is being used at the time), and thus set a rate of change of variation analogue into the instrument. The variation rate setting positions the variation rate potentiometer 103 in the instrument. The voltage from the wiper of this potentiometer is taken through the variation relays 105, 106 to the input side of the variation rate amplifier 108. The output from this amplifier is fed back to the rate motor generator 109 in the instrument causing the motor 109b to operate. A voltage proportional to motor speed is produced by the generator 109a and is fed back to the other side of the input of variation rate amplifier 108. This second voltage subtracts from the voltage from the rate potentiometer 103 and as the motor speeds up the error signal at the input of amplifier 108 will be reduced to zero or very nearly zero. At this time the motor 109b will stop accelerating and will continue to run at a constant speed unless the voltage from the variation rate potentiometer 103 is increased or decreased. If the motor 109b tends to speed up the output from the generator 109a will be greater than the signal from the potentiometer 103 and the error signal to the amplifier 108 will be reversed causing the motor 109a to slow down again.

The rate motor generator 109 drives the variation shaft 112 through a gear box 113 and gears 114, 115 and causes it to slowly change at a rate equivalent to that which was set on the variation rate scale on the front of the instrument, that is to say, the variation shaft 112 is driven at a speed analogous with the analogue of the rate of change of variation. Between the variation rate dial 18 and the gear box output are two friction clutches 116, 117 and a solenoid operated clutch 118. The solenoid operated clutch 118 and the first friction clutch 116 are a speed-changing mechanism associated with the remote variation control. The other friction clutch 117 permits the variation to be manually turned against the torque provided by the motor 109b. Variation rate as provided by the rate motor generator 109 is also fed to the auto-pilot synchro 120.

Remote Variation Rate Circuit

Two relays 105 and 106 are operated from either slaving switches 120, 121 on an outside servo drive unit or by a remote variation control switch located at another station in the aircraft. Operation of one of these relays 105, 106 increases the variation setting, the other decreases the variation setting of the instrument. This is accomplished by driving variation rate motor generator 109 at maximum speed and at the same time, by means of the solenoid operated clutch 118, the output of the gear box 113 is increased in speed by a factor of approximately 120. This gives a maximum rate of approximately 80° per minute.

Electrically, this is accomplished by applying a much higher voltage to the input of variation rate amplifier 108. At the same time relay 105 (or 106) energizes the variation rate solenoid 125 of the solenoid operated gear 118 to change the gear ratio from gear box 113, by moving gear 126, to the variation shaft 112. When the solenoid is energized the drive through the friction clutch 117 is by-passed and the clutch 117 slips to permit the higher speed. This change of variation setting is fed to both the auto-pilot synchro 120 and the "course-to-steer" synchro 135 (hereinafter described) so that these signals will be corrected for any correction to variation.

*The Course to Steer Circuit*

The double pointer 13 on the face of the instrument is fixed to shaft 100 which passes through shaft 71a, and indicates to the navigator, a true course to steer and is positioned by him by the course-to-steer knob 14, also on the front of the instrument (FIGURE 1). The analogue of the true course to steer which thus appears on the double pointer 13 is mechanically transmitted through gears 127, 128, 129, 130 to shaft 100 and to the differential 90 where the analogue of variation is subtracted. The output of the mechanical differential 90 positions the course-to-steer synchro 135 which transmits magnetic course-to-steer to a pilot's steering indicator such as described in the copending Wright application Serial No. 792,516.

Normally the navigator will set the command course to steer into the instrument and this course will be a true course to steer. Since the instrument, according to the invention, takes into account the rate of change of convergency, that is to say the rate of alteration of heading required to follow a great circle path, the navigator may be using a conformal chart lay-off an approximate initial great circle course which can be measured. It is this course to steer which navigator sets into the instrument in terms of true heading and which is repeated to the pilot in terms of magnetic heading. Whilst a conformal chart is preferred, as the measurement of the initial course can be made with a protractor, a Mercator chart can be used by measuring a Rhumb line course and applying the so-called conversion (to a great circle) from the Nomogram printed on most such charts or by use of the formula, conversion angle=½ .d long. sin mid. lat. By the continuous addition of the analogue of convergency through gear 143 and friction clutch 144, the course to steer is kept up to date as a great circle course.

*The Convergency Circuit*

Convergency is computed in a computor such as that described in the Wright et al. copending application Serial No. 792,520.

An electrical analogue of convergency is transmitted to the instrument by means of a three wire step-by-step circuit. In the instrument this signal is received by convergency motor 140 which is a "Desyn" type step motor. As a suitable scale, one revolution or twelve steps on this motor can be made the equivalent of one degree of convergency.

The mechanical analogue of convergency in the instrument is mechanically transmitted by motor 140 and added through gear box 141, gears 142, 143, differential 150, idler 152 and gears 153, 154 to the signal for the autopilot and through gear box 141, gears 142, 143 and clutch 144 to the course-to-steer shaft 100. It is also fed to the rotating case of gyro control transformer 51 through gear 143, gear 131, shaft 132 and gears 133, 134.

*The Autopilot Circuit*

The purpose of the autopilot synchro 120 it to provide an on-course signal to an autopilot to keep the aircraft on any selected heading. The initial heading for the aircraft to fly is selected by the navigator and set into the instrument by knob 14. The autopilot is coupled to the instrument through synchro 120. This initial heading is referenced to the magnetic heading shaft 32 and in order to fly a great circle path it must be corrected for changes in variation and for convergency. As mentioned these two corrections are combined as mechanical analogues in a mechanical differential 150 and transmitted to a second mechanical differential 151 through idler gear 152 and gears 153, 154 and shaft 155 where they are added to the magnetic heading analogue from gear 37. An electro-mechanical clutch 156 transmits the input of the second differential (which passes through gear 156, shaft 157 and gears 158, 159) to autopilot synchro 120. In operation, all that need be done is to energize the magnetic clutch 156 by means of the autopilot controlled in the aircraft and the aircraft will fly a great circle course which is dictated by the aircraft heading at the time the clutch 156 is energized.

Preferably, the electrical signal for the autopilot is obtained from two leads of autopilot synchro 120. Thus synchro 120 preferably has its rotor continuously excited by 26 volts 400 c.p.s. from the aircraft autopilot power supply. The autopilot power supply is used for this purpose to lessen any phasing problems which may occur. Correct phasing is provided by resistors (not shown) in excitation to the rotor of synchro 120. The output from synchro 120 is simply a left-right steering signal and not a position signal such as the normal output from a synchro transmitter. A 28 volt D.C. from the autopilot power supply is used to operate the magnetic clutch 156 associated with synchro 120. With the autopilot switched off or with the autopilot disengaged, or with the autopilot controller handle out of its detent position, this 28 volt D.C. signal is not available and the instrument will not be coupled to the autopilot. The 28 volt D.C. power to the autopilot synchro clutch 156 also passes through a contact of the manual slaving switch 47. This prevents the fast change in the heading circuit due to a manual gyro slaving operation from appearing as part of the signal to the autopilot. When the manual slaving switch 47 is operated the clutch 156 is de-energized and the autopilot synchro 120 does not follow the angular change of the magnetic heading shaft 32. It will also be noted that only the slow changes due to convergency and the output of the variation rate motor 109b are allowed to affect the autopilot synchro 120. Manually set variation does not reach the autopilot synchro 120 so that a sudden change in the value of the analogue of variation does not cause the aircraft to go off course.

Autopilot synchro 120 has on its shaft a spring-loaded heart cam 160 which automatically recenters or re-zeros the synchro 120 whenever the magnetic clutch 156 is de-energized. When the instrument is uncoupled from the autopliot by virtue of the magnetic clutch 156 being unoperated, this heart cam 160 will keep the output of synchro 120 at zero level. Thus when the clutch 156 is energized there is no signal transmitted to the autopilot until the aircraft drifts off course. When this happens a correcting signal will be provided by synchro 120 which will follow any change of heading.

*Free Gyro Mode*

If the output from the flux valve is unsuitable, for example, in very northern latitude the magnetic-directional gyro switch 46 is moved to the directional-gyro position, that is switch 46 is actuated to make contact 46a. In this position the output from the amplifier 45 is disconnected from the torque motor 48, the gyro 49 will operate as a directional gyro and the heading transmitter 50 will then generate a reference analogue output signal which is analogous with the gyro heading.

When an aircraft flies on directional gyro with a constant directional gyro heading the resulting track will be a great circle and the true heading (and magnetic heading) will be constantly changing. The directional gyro provides a space reference for aircraft heading rather than a geographic reference such as the earth's magnetic field and as a result the aircraft is inherently led along a great circle course if a fixed heading relative to the space oriented gyro is maintained. In the instrument.

this inherent difference between spacial, and geographical meridianal reference is substracted from the directional gyro heading by means of the rotating case of the gyro control transformer. The pointer 12 will now continue to display true heading and to transmit true heading to those sources requiring true heading.

In the Wright copending application Serial No. 792,517 there is disclosed an astro compass arrangement capable of generating a left, right signal which when applied to the relays 105, 106 (FIGURE 2A) causes motor-generator 109 to drive shaft 75 through clutches 118, 117, 116 to take up a new position. This new position corresponds to a new variation setting. The signal is applied to the relays 105, 106 until the true heading indication of the instrument is such that the relative bearing as observed by the operator of the astro-compass is correct. At this time, the relative bearing being correct, the true heading of the instrument is correct. In this manner, the true heading index is in effect slaved to said celestial body azimuth. In the case where the magnetic slaving mode is in use, the variation indicator will present the sum of local magnetic variation and aircraft-induced deviation. If local variation is known, the value of deviation may be read by setting the cursor 106 to the known variation value, which will allow east or west deviation to be read from the auxiliary scale. In the case where the free gyro mode is in use, the variation indicator will present simply the difference between the random alignment of the gyro and true heading.

What I claim as my invention is:

1. Apparatus for use with an aircraft primary directional index element capable of generating a reference analogue output signal, for continuously establishing the relationship of the output analogue signal from said directional index to an arbitrary basis of observation comprising: a first rotatable shaft, means for positioning said first rotatable shaft in response to said output signal; a second rotatable shaft; means for rotating said second rotatable shaft to a position analogous to the calculated value of variation of said directional index from an index based on said arbitrary basis of observation; a third rotatable shaft; motor means for driving said third shaft at an angular speed analogous with the derived analogue of the rate of change of said variation attributable to a selected reason; a further rotatable shaft; and differential means for algebraically summing said first and second analogues and the integral of said third analogue whereby to express the analogue of the result as the position of said further rotatable shaft being the analogue of vessel heading with respect to said arbitrary basis of observation at any given moment.

2. Apparatus, for use with an aircraft primary directional index element capable of generating a reference analogue output, for continuously establishing the relationship of the reference output analogue signal from said directional index element to a geographically true reference comprising: a first rotatable shaft; means for positioning said first rotatable shaft in response to said output signal; a second rotatable shaft; means for rotating said second rotatable shaft to a position analogous to the calculated value of magnetic variation of said directional index from a geographically true reference; a third rotatable shaft; motor means for driving said third shaft at an angular speed analogous with the derived analogue of the rate of change of said magnetic variation attributable to the aircraft's flight path; further rotatable shaft; and means for algebraically summing said first and second analogue and the integral of said third analogue whereby to express the analogue of the result as the position of said further rotatable shaft, being the analogue of vessel heading with respect to said geographically true reference at any given moment.

3. Apparatus, for use with a gyroscopic directional index element in an aircraft and with means capable of generating a magnetic heading reference analogue output signal, for continuously establishing the relationship of the output analogue signal from said directional index to a geographically true reference comprising: a first rotatable shaft; means for positioning said first rotatable shaft in response to said output analogue signal of magnetic heading; a second rotatable shaft; means for rotating said second rotatable shaft to a position analogous to the calculated value of magnetic variation of said directional index from a geographically true reference; a third rotatable shaft; motor means for driving said third shaft at an angular speed analogous to the derived analogue of the rate of change of magnetic variation attributable to the flight path of the aircraft; a further rotatable shaft; and differential means for algebraically summing said first and second analogues and the integral of said third analogue whereby to express the analogue of the result as the position of said further rotatable shaft, being the analogue of aircraft heading with respect to said geographical true reference.

4. Apparatus, as claimed in claim 3, wherein said further rotatable shaft is adapted to provide a heading signal for an auto pilot control means.

5. Apparatus as claimed in claim 3 further comprising a visual indicator and wherein said further rotatable shaft is adapted to cooperate with said visual indicator to provide a visual indication of the aircraft heading with respect to said geographical true reference.

6. Apparatus, for use with an aircraft primary directional index element capable of generating a reference analogue output signal, for continuously establishing the relationship of the output analogue signal from said directional index to an arbitrary basis of observation comprising: a first rotatable shaft, means for positioning said first rotatable shaft in response to said output signal; a second rotatable shaft; means for rotating said second rotatable shaft to a position analogous to the calculated value of variation of said directional index from an index based on said arbitrary basis of observation; a third rotatable shaft; motor means for driving said third shaft at an angular speed analogous with the derived analogue of the rate of change of said variation attributable to a selected reason; a fourth rotatable shaft; means for rotating said fourth rotatable shaft to a position analogous to the computed value of change in variation attributable to a further selected reason; a further rotatable shaft; and differential means for algebraically summing said first, second and fourth analogues and the integral of said third analogue whereby to express the analogue of the result as the position of said further rotatable shaft.

7. Apparatus, for use with a gyroscopic index element in an aircraft and with means capable of generating a magnetic heading reference output signal, for continuously establishing the relationship of the output analogue signal from said directional index to a geographical true reference comprising: a first rotatable shaft; means for positioning said first rotatable shaft in response to said output signal; a second rotatable shaft; means for rotating said second rotatable shaft to a position analogous to the calculated value of magnetic variation of said directional index from a geographically true reference; a third rotatable shaft; motor means for driving said third shaft at an angular speed analogous with the derived analogue of the rate of change of said magnetic variation attributable to the flight path of the aircraft; a fourth rotatable shaft; means adapted to rotate said fourth rotatable shaft to produce a compatible analogue signal of convergency of meridians; and differential means for algebraically summing said first, second and fourth analogues and the integral of said third analogue whereby to express the analogue of the result as the position on said further rotatable shaft.

8. Apparatus as claimed in claim 3 in which means are provided for setting into said apparatus for super-imposition on said first rotatable shaft a compatible analogue of a selected command course to be followed by said aircraft.

9. Apparatus for use with a gyroscopic directional index element in an aircraft, with means capable of generating a heading reference output signal, and an aircraft auto pilot control member comprising: differential means adapted to receive as a first input the analogue of magnetic heading; second differential means; means for setting into said second diffierential means as a first input thereto, a derived analogue of magnetic variation; means for setting into said second differential as a second input thereto a derived compatible analogue signal of rate of change of magnetic variation, transmission means between said second and said first differentials adapted to set into said first-mentioned differential means the analogue output signal of said second differential means; and transmission means for transmitting an output signal from said first differential means as a control signal to an auto pilot control member.

References Cited in the file of this patent
UNITED STATES PATENTS

| | | |
|---|---|---|
| 1,070,835 | Nowak | Aug. 19, 1913 |
| 1,985,265 | Smith | Dec. 25, 1934 |
| 2,444,549 | Anderson | July 6, 1948 |
| 2,555,328 | Esval et al. | June 5, 1951 |
| 2,602,587 | Dawson | July 8, 1952 |
| 2,665,069 | Imm | Jan. 5, 1954 |
| 2,936,950 | Parsons | May 17, 1960 |